Feb. 26, 1957 L. PESSEL 2,783,209
METHODS AND MEANS OF MARINE MARKING
Filed Nov. 23, 1953
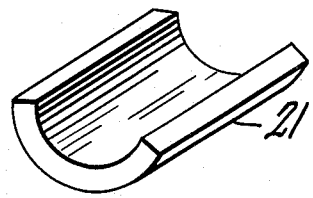
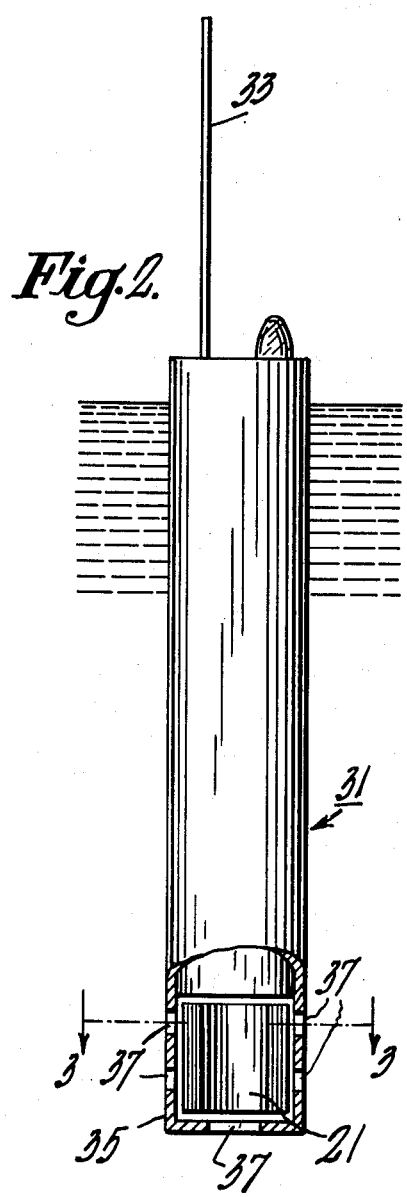
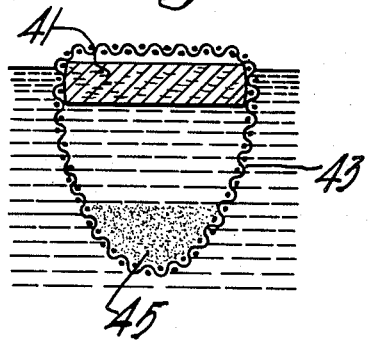
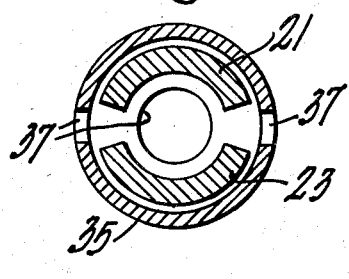
INVENTOR.
Leopold Pessel
BY
J. L. Whittaker

United States Patent Office 2,783,209
Patented Feb. 26, 1957

2,783,209

METHODS AND MEANS OF MARINE MARKING

Leopold Pessel, Wyndmoor, Pa., assignor to Radio Corporation of America, a corporation of Delaware Application November 23, 1953, Serial No. 393,679

4 Claims. (Cl. 252—301.3)

This invention relates to methods and means of marine marking and more particularly to marine marking compositions that may be dropped on the surface of a large body of water and subsequently produce an area that may readily be detected by aerial observers.

It is frequently desirable to produce a temporary marking at or near the surface of a large body of water that may easily be seen by aerial observers. For example, one may wish to locate visually the position of objects or devices, such as sonobuoys, that have been dropped upon the ocean. In the case of ship or plane wrecks, survivors afloat on life rafts, buoys and the like may wish to call the attention of airplanes searching for them. A submarine in distress far below the surface of the water may wish to indicate its location. In time of war, planes and ships may wish to mark the position where an enemy submarine was seen for the benefit of approaching armed craft. It is sometimes desirable to designate temporarily a landing area for the use of sea planes so that they may have an indication of the best position for landing and to facilitate estimating elevation.

One requisite of a marine marking is luminosity, that is, the feature of sufficient brightness to render the marked area visible from considerable distances, such as from aircraft flying at moderate altitudes. A pronounced brightness or luminosity is obtained if the marking material possesses fluorescent characteristics when dissolved in water. A characteristic material of this nature is the organic dye fluorescein which produces a strong green surface fluorescence visible for great distances. Unfortunately, there are no known dyes possessing a fluorescence of similar intensity in other portions of the spectrum. When red markings are desired, for example, a dye such as rhodamine, is used. Such dyes give the water an intense red coloration. However, when viewed from aircraft above, the area appears rather dark. While the water has an intense red appearance in transmitted light, very little light is reflected from the marked area to the aerial observers.

Marine devices adapted to float at or near the surface of water, such as sonobuoys, may be equipped with a quantity of dry marking material in a glass container placed in the shell of the device. When the device is dropped to the water surface, a mechanism shatters the glass container and releases the marking material into the water. The marking material is usually completely dissolved in about 15 minutes. Since the sonobuoy stays afloat for over an hour, ocean currents and wind will usually dissipate the marked area long before the sonobuoy sinks.

It is an object of this invention to provide improved methods and means for producing temporary visual markings in a body of water.

Another object is to provide methods and means for producing a temporary visual marine marking of high luminosity.

A further object is to provide marine marking compositions and devices that are small, light-weight, easily portable, relatively cheap and simple to manufacture, and simple to use.

Another object is to provide methods and means for controlling the rate of dissolution of a marine marking composition.

In general, the present invention includes methods and means of producing temporary visible markings in a body of water which comprises introducing into the body of water in the area to be marked a light-colored, finely-divided solid material. Reflected light from the milk-like water mass assumes a great brilliance and luminosity to an observer above. A water soluble dye may also be included so that areas may be marked with various colors of great brilliance. Although any material that produces a finely-divided solid phase in water may be used, the preferred compositions are those materials such as soluble salts of bismuth, antimony, tin, titanium and zirconium, which will first dissolve in water and subsequently react with water, as by hydrolysis, to produce a finely-divided water insoluble substance. This invention also includes the incorporation of a dye in a matrix composed of a material, such as polyethylene glycol, having the desired rate of dissolution.

The invention will be described in greater detail by reference to the accompanying drawing in which Figure 1 is a perspective view of a typical compacted mass having a composition of the present invention;

Figure 2 is a partially sectional elevational view of a partially submerged sonobuoy containing the compacted mass illustrated in Figure 1;

Figure 3 is a sectional view taken along the section 3—3 of Figure 2 of a sonobuoy including the invention;

Figure 4 is a sectional elevational view of a marine marking device including the invention.

Similar reference characters are applied to similar elements throughout the drawing.

Great brilliance and luminosity may be obtained by introducing in a mass of water a material which will form a finely-divided, but virtually water-insoluble, substance which remains in suspension within the mass of water. When viewed from above, this suspension exhibits a great increase in luminosity due to the increased reflectance from the suspended particles. The finely-divided, water-insoluble phase may be a milky dispersion or a foam. For instance, by dispersing diglycol oleate in water both foams and emulsions may be formed. Similarly, stearic acid or a hydrophobic starch ester, such as a "Dry Flow" marketed by National Starch Products Co., New York, N. Y., dispersed in water by suitable means forms an easily visible scum.

While these examples indicate several satisfactory embodiments of the invention, a preferable method of producing marine markings is to dissolve a compound which, although initially soluble in water, shortly after solution undergoes a reaction which precipitates a finely dispersed, water-insoluble phase. Such a compound may be, for instance, a metallic salt which either undergoes hydrolytic decomposition, leading to the formation of a water-insoluble oxide or hydroxide, or which reacts with some components in the water, such as chloride or sulfate ions, to produce a virtually water-insoluble compound. Some examples of such metal compounds are soluble salts of bismuth, antimony, tin, titanium, zirconium, and others. For instance bismuth nitrate, or chloride, shortly after dissolution, decomposes into a finely-divided dispersion of water-insoluble oxy-nitrate or oxy-chloride thereby providing the desired milky background. Antimony trichloride reacts similarly to form antimony oxy-chloride. Stannous chloride dissolves readily, but quickly oxidizes to the stannic compound which hydrolyzes to form stannic oxide or hydroxide. Titanium sulfate and zirconium tetrachloride decompose to form water insoluble oxides, hydroxides, basic salts, etc. Salts with other acid radicals, especially organic salts such as acetates, glycollates, etc., may be used. The preferred metallic salts are bismuth chloride, stannous chloride, and titanium sulfate. Aqueous solutions of these compounds produce areas that are easily seen when viewed from above.

An additional improvement is obtained by adding a dispersing agent, preferably of the anion-active type, which seems to accelerate the formation of a milky dispersion. It is desirable, but not essential, that the dispersing agent provide a solubility regulation to control the rate at which the suspension-forming material dissolves in the water. "Nacconol NR," a sodium kerylaryl sulfonate manufactured by the National Aniline and Chemical Co. of New York, N. Y., may be used for this purpose. This material is a mixture of compounds produced by neutralizing the sulphonated benzene condensate of chlorinated petroleum fractions. The term "keryl" is commonly used to designate a group of saturated aliphatic hydrocarbon radicals of the alkyl group having an average molecular weight corresponding to a chain of about 14 carbon atoms. There is no critical weight proportion of dispersing agent to metallic salt. The dispersing effect becomes noticeable with only 0.5% by weight of the dispersing agent. Much higher percentages, up to 90% by weight with respect to the weight of the insoluble substance forming material of the dispersing agent may be used, especially if the dispersing agent is used as a solubility-regulator also.

While the above-described method produces luminous white markings, it is frequently desirable to produce markings of different colors, as for example, when there are whitecaps on the ocean surface. This may be accomplished by dissolving a water-soluble dye in the water along with the solid phase forming material. If a milk-like water mass such as described above is dyed, the reflected light from the water mass assumes great brilliance and luminosity, resembling in brightness value the optical effect that would be obtained from a fluorescent dye, but being related in hue to the color of the dissolved dye. The combination of a dye, with a reflecting, finely-divided, water-insoluble phase forms a marking superior to a marking produced by the use of a dye alone, and which is easily discernable from other markings on the ocean surface. If a red dye such as rhodamine is used, a brilliant, luminous, rose-colored marking results. If a blue dye, such as aniline blue, is used a brilliant ultramarine-colored water mass may be observed. Analogous effects result with dyes of other colors.

In using this principle for marking the location of a floating device, such as a sonobuoy, dyes of red shades are preferred. Such dyes may be of the rhodamine type, but any other shade or designation of chemical dye composition may be used. Thus dyes like crocein, carmine, fuchsine, safranine, etc., may be utilized with similar results. The maximum dye intensity is obtained with dyes of the rhodamine type.

Ordinarily, the dyes used for marine marking dissolve very rapidly. After solution, the dyed water becomes dissipated rapidly due to ocean currents, wind and migration of the dye. Dye markers that are presently used with some marine devices become dissipated in about 15 minutes. It is therefore desirable to compound the dye with a water-soluble material which acts as a solubility regulator which controls the rate of dissolution of the dye in water. Where the dye is extremely soluble and it is desired to reduce the rate of dissolution, the dye is incorporated in a matrix composed of a material having a lower rate of dissolution. When the mass is immersed in a body of water, the matrix dissolves releasing the dye at the desired rate. An example of a material that reduces the rate of dissolution of dye material is a polyethylene glycol of high molecular weight which is wax-like, solid and water-soluble. Such a material is made and marketed under the trade designation "Carbowax 6000" by the Carbide and Carbon Chemical Corp. of New York, N. Y. Chemically, this material is a polyethylene glycol of the average molecular weight of 6000. Any solid polyalkylene glycol may be used. However polyethylene glycols with relatively high average molecular weights are preferred. Where the dye is slightly soluble and it is desired to increase the rate of dissolution, the dye may be incorporated with a dispersing agent. Examples of materials which increase the rate of dissolution are the sodium keryl-aryl sulphonates mentioned above. These same methods may be used for controlling the rate of dissolution of the other components of the compositions of this invention.

The ratio of dye to solubility regulator may be varied over a wide range without detracting from the principle of the invention. Generally speaking, the solubility regulator comprises between 10% and 90% of the dye-regulator mixture, although a proportion of approximately 50% dye and 50% solubility-regulator appears to be preferable.

A preferred type of signalling device for use on bodies of sea or fresh water is a compacted mass of the desired composition. The compacted mass may be a block that has been cast, or pressed or otherwise formed into the desired geometrical shape or structure. Figure 1 illustrates a typical block that has been formed by pressing. The metallic salts may either be compounded with the dye, or the metallic salt and the dye may be compounded separately. The ingredients may be packed as powders or as blocks of compacted material. They may comprise one or more ingredients in a package or block. They may be utilized as separate units, packed with or without a solubility-regulator.

One or more of the ingredients may be formed into a block by dispersing the solid ingredients into the fusible ingredients that have been melted, stirring until a homogeneous mixture is obtained, pouring the molten mixture into molds, and then allowing the cast blocks to cool.

Blocks may also be prepared by pressing or briquetting dry mixtures of the powdered ingredients. If the pressing or briquetting method is used, the solubility regulator may be a water-soluble material such as powdered methyl cellulose or polyvinyl alcohol. If the casting method is used, materials such as glue, wax-like water-soluble surface active materials such as lauryl pyridinum chloride or other quaternary ammonium bases, polyethylene glycol fatty esters such as Nonisol 250, made by Alrose Chemical Co. of Providence, R. I., sodium alkyl naphthalene sulfonates such as "Sorbit" made by Alrose Chemical Co., of Providence, R. I. or other sodium aryl alkyl sulfonates such as "Nacconol NR" made by National Aniline Co. of New York, N. Y. may be used. The materials mentioned are not all inclusive, but merely exemplary of materials that may be used to control the rate of dissolution of the dye and the metallic salt.

EXAMPLE 1

*Composition A.*—One part by weight of Calcozine Rhodamine B X P (made by Calco Chemical Division of Bound Brook, N. J.) is dispersed in one part by weight of molten Carbowax 4000 (made by Carbide and Carbon Chemical Corp., New York, N. Y.) and stirred until a homogeneous molten mixture is obtained. This mixture is poured into molds and permitted to solidify into blocks weighing about 100 grams. Referring to Figure 1, a suitable block 21 shape for use in a sonobuoy is a sector of a cylindrical shell.

*Composition B.*—Two parts by weight of anhydrous stannous chloride is dispersed in one part by weight of molten Carbowax 6000, and stirred until a homogeneous molten mixture is obtained. The mixture is hot-pressed into blocks of the shape shown in Figure 1 weighing about 100 grams each, and then permitted to cool.

The blocks of composition A and composition B are wrapped in a water-soluble film such as polyvinyl alcohol about .002 inches thick. The wrapping is for convenience in that it prevents the dye from staining its surroundings during handling.

Referring to Figures 2 and 3, one block 21 of composition A and one block 23 of composition B are inserted in contact with the inner surface of the shell 35 in the lower end of a cannister 31 of a sonobuoy. The sonobuoy is then dropped into the sea where it floats with its antenna 33 out of the water and the opposite end with the blocks 21 and 23 submerged. Sea water, which is free to pass in and out of the lower end of the cannister through holes 37, first dissolves the soluble film and then slowly dissolves the blocks 21 and 23. The Carbowax 4000 in composition A controls the rate of dissolution of the Rhodamine yielding a red colored water mass. The Carbowax 6000 in composition B controls the rate of dissolution of the stannous chloride. The stannous chloride upon oxidation and hydrolysis produces a milky white suspension. When the two are combined in the surrounding water and viewed from an airplane, the area around the dropped buoy assumes a brilliant bluish-rose marking which persists for at least one hour, clearly marking the location of the buoy. When composition A is used alone, without addition of the water-insoluble phase forming material of composition B, the water area appears a dark red and lacks the brilliance and luminosity of the marking produced by the combination method of this invention.

EXAMPLE 2

*Composition C.*—Two parts by weight titanium sulfate, in form of a filter cake containing about 50% sulphuric acid, is crushed into small particles and introduced, under thorough stirring into a molten mixture of one part by weight of Carbowax 6000, and one part by weight of "Nacconol NR." The viscous mixture is pressed into blocks of the shape shown in Figure 1, permitted to solidify, and then is wrapped in a thin film of polyvinyl alcohol as described above.

Referring again to Figures 2 and 3, one block of composition A and one block of composition C are inserted in a sonobuoy and subjected sea water as described in Example 1. A brilliant, reddish-rose colored marking of long persistence is easily visible to an aerial observer.

EXAMPLE 3

Referring to Figure 4, one part by weight of aniline blue ("Lyons Blue" or "China Blue"), and one part by weight of bismuth trichloride, BiCl$_3$ crystals are ground together to a fine, homogeneous powder mixture. A quantity of the mixture 45 is placed into a porous cloth bag 43 having a cork float 41 therein. The bag is then dropped into a body of water. As the mixture dissolves the water body about the immersed bag, as viewed from above, appears as a bright ultramarine marking of high luminosity. When carrying out the same procedure, using dye alone, the water surface, when viewed from above, had a dark, "dead," almost black appearance. Instead of using a porous bag, the powder may be compacted into a block and the composition adjusted so that the block floats on water.

There has thus been described novel methods and means for producing in a body of water temporary visual markings that are characterized by high luminosity and light reflectivity. The devices are small, light weight, easily portable, relatively cheap and simple to manufacture and simple to use.

What is claimed is:

1. A marine marking device comprising a water-permeable container having therein a compacted mass of a mixture consisting essentially of about 50% titanium sulphate, about 25% of sodium kerylbenzene sulphonate and about 25% of a solid polyethylene glycol.

2. A marine marking device comprising a water-permeable container having therein a first compacted mass consisting essentially of about 50% by weight of titanium sulphate, about 25% by weight of sodium kerylbenzene sulphonate, and about 25% by weight of a solid polyethylene glycol, and a second compacted mass consisting essentially of about 50% by weight of Rhodamine and about 50% by weight of a solid polyethylene glycol.

3. A marine marking composition consisting essentially of a mixture of about 50% by weight of a water-soluble material which reacts with water to form a finely-divided water insoluble substance, said water-soluble material being selected from the group consisting of solid, readily-hydrolyzable, water-soluble salts of bismuth, antimony, tin, titanium and zirconium; about 25% by weight of a water-soluble, anion-active dispersing agent; and about 25% by weight of a solid material selected from the group consisting of polyalkylene glycols, methyl cellulose, polyvinyl alcohol and glue.

4. A marine marking device comprising a water-permeable container having therein a first compacted mass consisting essentially of a mixture of about 50% by weight of a water-soluble material which reacts with water to form a finely-divided water insoluble substance, said water soluble material being selected from the group consisting of solid, readily-hydrolyzable, water-soluble salts of bismuth, antimony, tin, titanium and zirconium; about 25% by weight of a water-soluble, anion-active dispersing agent; and about 25% by weight of a solid material selected from the group consisting of polyalkylene glycols, methyl cellulose, polyvinyl alcohol and glue; and a second compacted mass comprising about 50% by weight of a water-soluble dye and about 50% by weight of a solid material selected from the group consisting of polyalkylene glycols, methyl cellulose, polyvinyl alcohol and glue.

References Cited in the file of this patent

UNITED STATES PATENTS

| | | |
|---|---|---|
| 2,420,286 | Lacey | May 6, 1947 |
| 2,439,598 | Dinsley | Apr. 13, 1948 |
| 2,675,776 | Tuve | Apr. 20, 1954 |

OTHER REFERENCES

Perry and Schwartz: Surface Active Agents, 1949, pp. VII, VIII (Table of Contents), pp. 25, 122.

Mellor: Comprehensive Treatise on Inorganic and Theoretical Chemistry, vol. 7, page 89.

Soap and Sanitary Chemicals, September 1949, p. 52.